A. M. SONNICHSEN.
TIRE GAGE.
APPLICATION FILED DEC. 10, 1917.

1,274,620. Patented Aug. 6, 1918.

Witnesses:
W. C. Smith

Inventor
Andreas M. Sonnichsen
By Jones, Addington, Ames & Seibold
Attys.

UNITED STATES PATENT OFFICE.

ANDREAS M. SONNICHSEN, OF MILWAUKEE, WISCONSIN, ASSIGNOR TO PROTEX MANUFACTURING COMPANY, OF CHICAGO, ILLINOIS, A CORPORATION OF ILLINOIS.

TIRE-GAGE.

1,274,620.  Specification of Letters Patent.  Patented Aug. 6, 1918.

Application filed December 10, 1917. Serial No. 206,519.

*To all whom it may concern:*

Be it known that I, ANDREAS M. SONNICHSEN, a citizen of the United States, residing at Milwaukee, in the county of Milwaukee and State of Wisconsin, have invented new and useful Improvements in Tire-Gages, of which the following is a full, clear, concise, and exact description, reference being had to the accompanying drawing, forming a part of this specification.

My invention relates to improvements in tire gages, and has for its object the production of a device by means of which the pressure within an automobile tire may be ascertained without any liability of deflating the tire during the operation.

A further object is the production of a device by means of which the indicated pressure may be read after the gage is detached from the tire.

A further object is the production of a device of simple though efficient construction, and one not liable to disarrangement of parts.

A further object is the production of a device in which the tension of the spring may be readily adjusted without disturbing the balance of the device.

A further object is the production of convenient means through the medium of which the pressure may be accurately read and the registering mechanism returned to its initial position.

These and such other objects as may hereinafter appear are attained by my device, an embodiment of which is illustrated in the accompanying darwings, in which—

Like numerals of reference indicate like parts in the several figures of the drawing.

Figure 1:
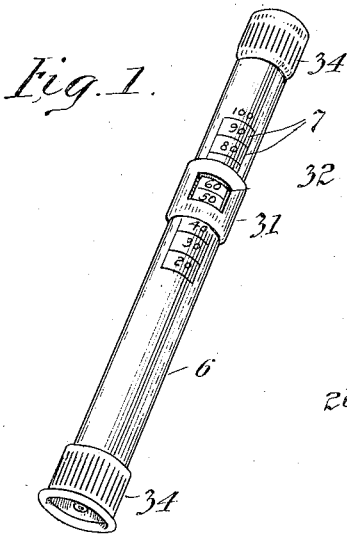
Figure 1 represents a perspective view of my device looking toward the front; —
Figure 2:
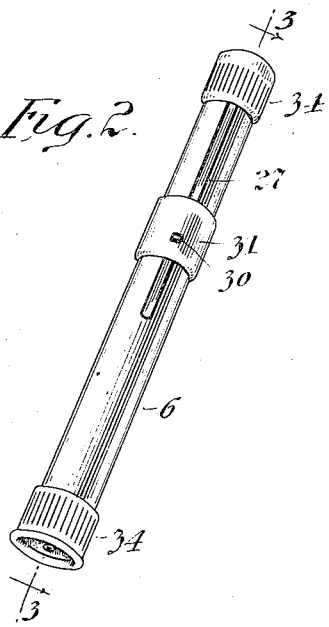
Fig. 2 is a perspective view showing the rear of my device.
Figure 3:
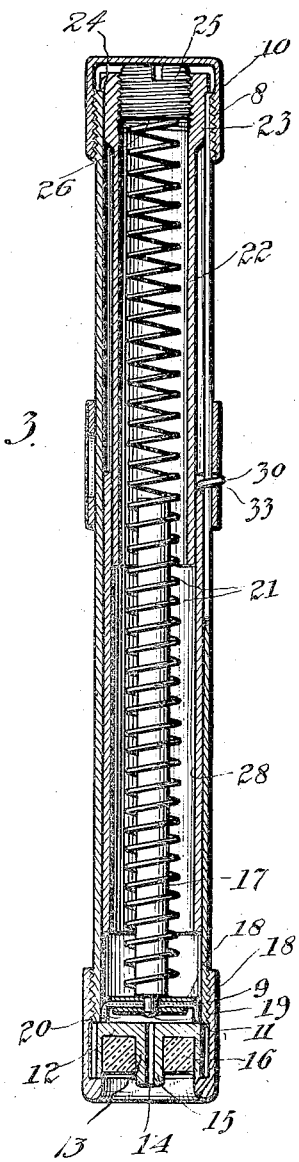
Fig. 3 is an enlarged sectional view of my device taken on the line 3—3 of Fig. 2 looking in the direction indicated by the arrows.
Figure 4:
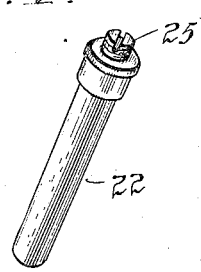
Fig. 4 is a perspective view of my adjusting mechanism.
Figure 5:
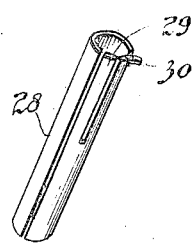
Fig. 5 is a perspective view of a detail of Fig. 1.

Referring now to the drawing, 6 represents the outer casing having an indicating scale 7 on its front outer face. This casing is threaded at its upper end 8 and at its lower end 9, and provided at its top with a screw cap 10 and at its bottom with a screw base 11. Fitting within the screw base 11 is a metal cup 12 having a central stem provided with an opening 14 extending therethrough. The end 15 of the stem projecting above the surface of a rubber washer 16 mounted within the cup, serves to unseat the ordinary tire valve when the gage is pressed thereon. A piston rod 17 is mounted within the cylinder having a pair of metal washers 18—18' riveted on the bottom, and also having a rubber or felt washer 19 positioned between the metal washers 18—18' serving to make an air tight piston head between the chamber 20 above the metal cup 12 and the bottom of the piston.

A spring 21 surrounds the piston rod 17 and extends from the bottom of the piston practically to the top of the casing. A guiding sleeve 22 extends downwardly from the top of the casing of sufficient diameter to permit the entrance of the spring 21. This sleeve is enlarged as shown at 23, making a tight fit with the bore of the casing and is provided with a peripheral shoulder 24 fitting on the top of the casing. An adjusting screw 25 is screwed within the top of this sleeve, the bottom 26 of which engages the top of the spring 21. It will thus be seen that by the adjustment of the screw 25 the tension of the spring 21 may be made within reasonable limits, or in fact within any limit by varying the length of the screw or extending its end downwardly within the guiding sleeve.

The outer casing is provided with a slot 27 extending lengthwise thereof throughout the upper half of its periphery, and a split spring sleeve 28 is provided having a spring member 29 adapted to press against the inner periphery of the casing and frictionally hold the sleeve in any desired position. A portion of the upper edge of the spring member 28 is turned outwardly forming an ear 30 adapted to enter within the slot 27 in the casing and into an opening in a registering sleeve 31 which is adapted to slide loosely over the outer periphery of the casing between the ends. This registering sleeve has a window or opening 32, through which the numerals of the indicator 7 may be read. An opening 33 is provided on the opposite periphery to that of the window into which the ear 30 enters.

It will be noted that the movement of the sleeve up and down carries with it the spring member 28. The bottom of this spring member when the sleeve is at its lowest position rests on the top of the washer 18.

In the use of my device, when the gage is pressed on the top of the tire valve the end 15 of the stem unseats the valve permitting air to pass through the opening 14 and into the chamber 20 beneath the piston, forcing the piston upwardly against the pressure of the spring 21 resting against the bottom of the adjusting screw 25. As the pressure increases the upward movement of the piston carries with it the spring member 28 and also the registering sleeve 31. When the maximum pressure within the tire is reached the registering sleeve has traveled upwardly along with the member 28 and the maximum pressure is shown through the window 32. When the gage is taken off the tire valve, the friction member together with the registering sleeve is held in its highest position and remains there until it is forced down by hand, making it unnecessary to see what the pressure is at the instant the gage is withdrawn as any length of time can elapse between making the test and reading the pressure.

By the use of the adjusting screw 25 I make it possible to take care of any irregularities between actual pressure and indicated pressure in the event that the spring becomes worn, it simply being necessary to remove the cap 10 and turn down the screw 25 until the desired tension is secured. By the use of the cap 10 all danger of varying the tension of the spring by careless handling is avoided, and by nurling the outer periphery of the caps 10 and 11 as shown at 34, it becomes possible to readily screw and unscrew the caps in assembling, disassembling and adjusting the parts.

I am aware that other modifications may suggest themselves that are not here set forth, but which will come within the spirit of my invention.

Having thus described my invention, what I claim as new and desire to secure by Letters Patent is:

1. A tire gage comprising an outer slotted casing, having indicating numerals thereon, a piston head, a piston rod mounted within said casing, an open screw threaded cap adapted to fit over the bottom of said casing, a valve unseating means mounted in said cap below said piston head and having an opening communicating with the interior of said casing below the piston head, an adjusting screw fitting within the top of said casing and movable lengthwise thereof, a spring surrounding said piston rod and extending from the piston head to the base of the adjusting screw, a friction sleeve loosely mounted within said casing on the top of said piston head, said sleeve being provided with a projecting ear adapted to extend through the slot in said casing, a registering sleeve mounted on the outside of said casing and engaging said ear whereby the maximum upward movement of said frictional sleeve may be indicated on the scale on said sleeve.

2. A tire gage comprising an outer slotted casing, having indicating numerals thereon, a piston head, a piston rod mounted within said casing, an open screw threaded cap adapted to fit over the bottom of said casing, a valve unseating means mounted in said cap below said piston head and having an opening communicating with the interior of said casing below the piston head, an adjusting screw fitting within the top of said casing and movable lengthwise thereof, a spring surrounding said piston rod and extending from the piston head to the base of the adjusting screw, a friction sleeve loosely mounted within said casing on the top of said piston head, said sleeve being provided with a projecting ear adapted to extend through the slot in said casing, a registering sleeve provided with an opening opposite the scale on said outer casing whereby the maximum upward movement of said frictional sleeve may be read through said opening in the registering sleeve.

In witness whereof, I have hereunto subscribed my name.

ANDREAS M. SONNICHSEN.